United States Patent [19]
Ono et al.

[11] Patent Number: 5,673,150
[45] Date of Patent: Sep. 30, 1997

[54] ANTI-GLARE ELECTROCHROMIC MIRROR

[75] Inventors: Koichi Ono; Yutaka Yoshida; Hideki Miyatake; Tamotsu Horiba, all of Aichi, Japan

[73] Assignee: Kabushiki Kaisha Tokai Rika Denki Seisakusho, Aichi, Japan

[21] Appl. No.: 601,496

[22] Filed: Feb. 14, 1996

Related U.S. Application Data

[63] Continuation of Ser. No. 334,382, Nov. 3, 1994, abandoned.

[30] Foreign Application Priority Data

Nov. 5, 1993 [JP] Japan ................................. 5-276678

[51] Int. Cl.$^6$ ........................... G02B 5/08; G02F 1/15; G02F 1/153
[52] U.S. Cl. ..................... 359/603; 359/602; 359/265; 359/267; 359/268; 359/269; 359/270; 359/274
[58] Field of Search ........................... 359/602, 603, 359/265, 267, 268, 269, 270, 274

[56] References Cited

U.S. PATENT DOCUMENTS

| | | |
|---|---|---|
| 3,844,636 | 10/1974 | Maricle ........................... 359/267 |
| 4,448,493 | 5/1984 | Matsudaria et al. ................... 359/268 |
| 4,712,879 | 12/1987 | Lynam et al. ........................ 359/275 |
| 5,124,080 | 6/1992 | Shabrang et al. .................... 359/265 |
| 5,355,245 | 10/1994 | Lynam .............................. 359/267 |

FOREIGN PATENT DOCUMENTS

| | | | |
|---|---|---|---|
| 0 470 867 | 12/1992 | European Pat. Off. . | |
| 3615379 | 11/1986 | Germany . | |
| 0047934 | 3/1986 | Japan | ........................ 359/268 |
| 2 118 210 | 10/1983 | United Kingdom . | |
| 94/15247 | 7/1994 | WIPO . | |

*Primary Examiner*—Paul M. Dzierzynski
*Assistant Examiner*—Mohammad Y. Sikder
*Attorney, Agent, or Firm*—Finnegan, Henderson, Farabow, Garrett & Dunner, L.L.P.

[57] ABSTRACT

Anti-glare EC mirror comprises a transparent glass substrate with ITO film, $IrO_x$ film, $SnO_2$ film, $Ta_2O_5$ film, $WO_3$ film and Al film in the order written. Because of this layer arrangement, $SnO_2$ film insures an ample supply of water during the aging of $IrO_x$ film, thereby allowing the aging operation to be completed within a short period of time.

29 Claims, 4 Drawing Sheets

$\begin{pmatrix} X = 0.4476 \\ Y = 0.4074 \end{pmatrix}$ $\begin{pmatrix} X = 0.3127 \\ Y = 0.3290 \end{pmatrix}$

ANTI-GLARE ELECTROCHROMIC MIRROR

This application is a continuation of application Ser. No. 08/334,382, filed Nov. 3, 1994, now abandoned.

BACKGROUND OF THE INVENTION

1. Field of Invention

The present invention relates to an anti-glare electrochromic mirror that is capable of causing electrical changes in reflectance by utilizing the operating principle of electrochromic displays (ECDs).

2. Description of Prior Art

A conventional thin-film anti-glare electrochromic (called EC, hereinafter) mirror is shown in FIG. 8. As shown, the anti-glare mirror generally indicated by 1 comprises a transparent glass substrate 2 which is overlaid, in superposition, with a transparent electroconductive ITO film 3, an oxidatively coloring $IrO_x$ film 4, an electrolyte $Ta_2O_5$ film 5, a reductively coloring $WO_3$ film 6, and a reflective film 7 made of Al as an electroconductive material. In the construction shown in FIG. 8, the ITO film 3 and the Al film 7 serve as electrodes, between which a dc supply 8 is connected via a changeover switch 9.

When contacts a and b of the switch 9, as well as contacts d and e are closed, the positive terminal of the dc supply 8 is connected to the ITO film 3 whereas the negative terminal of the same supply 8 is connected to the Al film 7, whereupon a dc voltage is applied across the mirror 1 and an oxidation-reduction reaction occurs to initiate a coloring reaction in the $IrO_x$ film 4 and the $WO_3$ film 6. As a result, the reflectance of the mirror 1 is reduced by the colored $IrO_x$ film 4 and the $WO_3$ film 6 to provide an anti-glare effect. If contacts a and c of the switch 9, as well as contacts d and f are closed, a dc voltage is applied with opposite polarity and an oxidation-reduction reaction proceeds in the opposite direction, whereby the $IrO_x$ film 4 and the $WO_3$ film 6 becomes transparent again and the reflectance of the mirror 1 is sufficiently increased to remove the anti-glare effect.

The conventional EC mirror described above has had the problem that if the "aging" of the oxidatively coloring $IrO_x$ film 4 is inadequate, the reflective index difference at the interface between the $IrO_x$ film 4 and the $Ta_2O_5$ film 5 increases so much as to develop an intense interference color on the reflecting surface of the anti-glare EC mirror 1. If this mirror is used as an automotive mirror and if looked at by the driver at a slightly varying angle, the reflecting surface of the mirror will appear differently than it's inherent color and this is unpleasant to the eye and certainly not preferred from a practical viewpoint.

SUMMARY OF THE INVENTION

An object, therefore, of the present invention is to provide an anti-glare EC mirror that permits the oxidatively coloring film to be aged within a shorter period of time and which is capable of suppressing the occurrence of interference on the reflecting surface of the mirror.

This object of the invention can be attained by an anti-glare EC film comprising: a transparent substrate, a transparent electroconductive film formed on top of the transparent substrate; an oxidatively coloring film formed on top of the transparent electroconductive film; an interference suppressing film formed on top of the oxidatively coloring film; an electrolyte film formed on top of the interference suppressing film; a reductively coloring film formed on top of the transparent electrolyte film; and a reflective film formed of an electroconductive material on top of the reductively coloring film.

The reason for the increased intensity of interference is that because of insufficient aging of the oxidatively coloring $IrO_x$ film 4, it has a large refractive index difference from the electrolyte $Ta_2O_5$ film 5 at the interface. Therefore, interference can be suppressed if the aging of the oxidatively coloring film is accelerated and/or the refractive index difference between this film and the electrolyte film is reduced. Based on this assumption, the present inventors conducted various experiments and found the following two facts: the aging of the oxidatively coloring film could be accelerated by supplying water, and the refractive index difference between the oxidatively coloring film and the electrolyte film could be reduced by separating these two films with a film having an intermediate refractive index. Hence, a film that is capable of supplying water to the oxidatively coloring film or which has a refractive index intermediate between the indices of the oxidatively coloring film and the electrolyte film or a film that possesses both characteristics is inserted between the two films as an interference suppressing film, whereby the unwanted interference can be suppressed. The present invention has been accomplished on the basis of this finding.

According to the approach described above, an interference suppressing film having either one or both of the stated characteristics is formed on top of the oxidatively coloring film and this interference suppressing film in turn is overlaid with the electrolyte film. As a result, the aging of the oxidatively coloring film can be effected within a shorter period of time and yet the difference in refractive index between the oxidatively coloring film and the electrolyte film can be sufficiently reduced to suppress the interference on the reflective surface of the mirror to a satisfactory low level.

DETAILED DESCRIPTION OF THE PREFERRED EMBODIMENTS

Figure 1:
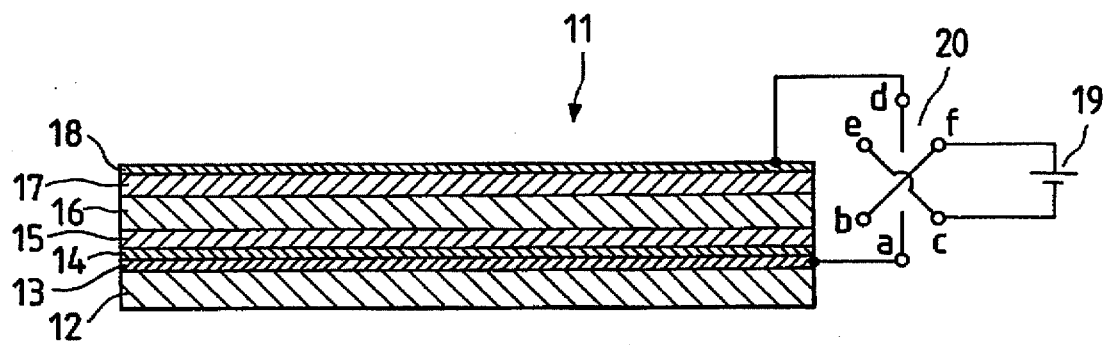
FIG. 1 is a longitudinal section of an anti-glare EC mirror according to a first embodiment of the invention.

A first embodiment the present invention is described below with reference to FIGS. 1 to 3. A thin-film anti-glare EC mirror that is generally indicated by 11 in FIG. 1 comprises: a transparent substrate 11 which is typically a transparent glass substrate; a transparent electroconductive film 13, typically an ITO film, that is formed on top of the transparent glass substrate 12; an oxidatively coloring film 14, typically an $IrO_x$ film, that is formed on top of the ITO film 13; an interference suppressing film 15, typically a $SnO_2$ film, that is formed on top of the $IrO_x$ film 14; an electrolyte film 16, typically a $Ta_2O_5$ film, that is formed on top of the $SnO_2$ film 15; a reductively coloring film 17, typically a $WO_3$ film, that is formed on top of the $Ta_2O_5$ film 16; and a reflective film 18 that is formed of an electroconductive material such as Al on top of the $WO_3$ film 17.

Each of the films 13 to 18 may be formed by a thin-film process such as evaporation and the total thickness of the assembly that is formed of the superposed layers 13 to 18 is about 1.5 microns. The specific values of the thickness settings for the respective films are as follows: ca. 200 Å for the ITO film 13; ca. 200 to 500 Å for the $IrO_x$ film 14; ca. 100 to 2000 Å for the $SnO_2$ film 15; ca. 5000 to 7000 Å for the $Ta_2O_5$ film 16; ca. 4000 to 5000 Å for the $WO_3$ film 17; and ca. 1000 Å for the Al film 18.

The $SnO_2$ film 15 has not only the ability to provide an ample supply of water to the $IrO_x$ film 14 but also a refractive index intermediate between the indices of the $IrO_x$ film 14 and the $Ta_2O_5$ film 16. Having these characteristics, the $SnO_2$ film 15 accelerates the aging of the $IrO_x$ film 14 so as to effectively suppress the interference that develops at the reflecting surface of the anti-glare EC mirror 11. The inventors confirmed by experimentation that the interference suppressing effect of the $SnO_2$ film 15 was further enhanced by setting its thickness to lie between about 300 and 1000 Å. The thickness of the $SnO_2$ film 15 is preferably set within the range from about 100 to 200 Å because if it is thinner than 100 Å, the intended aging accelerating effect is not attainable and if it is thicker than 2000 Å, the electrochromic response of the anti-glare EC mirror 11 deteriorates.

The ITO film 13 and the Al film 18 serve as electrodes, which are connected to a dc supply 19 via an changeover switch 20. If contacts a and b of the switch 9, as well as contacts d and e are closed, the positive terminal of the dc supply 19 is connected to the ITO film 13 whereas the negative terminal of the same supply 19 is connected to the Al film 18. On the other hand, if contacts a and c of the switch 9, as well as contacts d and f are closed, the negative terminal of the dc supply 19 is connected to the ITO film 13 whereas the positive terminal of the same supply 19 is connected to the Al film 18, causing a reverse dc voltage to be applied across the mirror 11.

If, in the construction shown in FIG. 1, the positive terminal of the dc supply 19 is connected to the ITO film 13 whereas the negative terminal of the same supply 19 is connected to the Al film 18, an oxidation-reduction reaction occurs and proceeds to the right-hand side of each of the three equations set forth below, whereby the $IrO_x$ film 14 and the $WO_3$ film 17 will be colored;

$IrO_x$ film

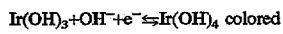

$Ir(OH)_3 + OH^- + e^- \rightleftharpoons Ir(OH)_4$ colored $Ta_2O_5$ film

$H_2O \rightleftharpoons H^+ + OH^-$ $WO_3$ film

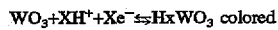

$WO_3 + XH^+ + Xe^- \rightleftharpoons H_xWO_3$ colored

As a result, the reflectance of the anti-glare EC mirror 11 is reduced by the coloring of the $IrO_x$ film 14 and the $WO_3$ film 17 to provide anti-glare effect (NIGHT-state, when applicable). On the other hand, if the positive terminal of the dc supply 19 is connected to the ITO film 13 whereas the negative terminal of the same supply 19 is connected to the Al film 18 so that a reverse dc voltage will be applied across the mirror 11, a reverse oxidation-reduction reaction occurs and proceeds to the left-hand side of each of the three equations set forth in the preceding paragraph, whereby the $IrO_x$ film 14 and the $WO_3$ film 17 will return to the clear state (becomes colorless). As a result, the reflectance of the mirror 11 is increased to remove the anti-glare effect (DAY-state, when applicable).

In the construction shown in FIG. 1, the $SnO_2$ film 15 is provided as an interference suppressing film between the $IrO_x$ film 14 and the $Ta_2O_5$ film 16 and it provides an ample supply of the water necessary for the aging of the $IrO_x$ film 14. As a result, the aging of the $IrO_x$ film 14 will progress rapidly so that it can be completed within a shorter period of time. In practice, the $IrO_x$ film 14 is aged by repeating the following procedure through about 10 cycles: applying a dc voltage between the ITO film 13 and the Al film 18 so that the $IrO_x$ film 14 colors (to provide the anti-glare effect) for 1 or 2 minutes and, thereafter, applying a reverse voltage so that the $IrO_x$ film 14 becomes colorless (the anti-glare effect is removed). In the first embodiment under consideration, the aging of the $IrO_x$ film 14 could be completed by 10 cycles of dc voltage application. This is sufficient for the purpose of reducing the refractive index difference between the $IrO_x$ film 14 and the $Ta_2O_5$ film 16 by a sufficient degree to accomplish satisfactory suppression of the interference at the reflecting surface of the anti-glare EC mirror 11.

Figure 8:
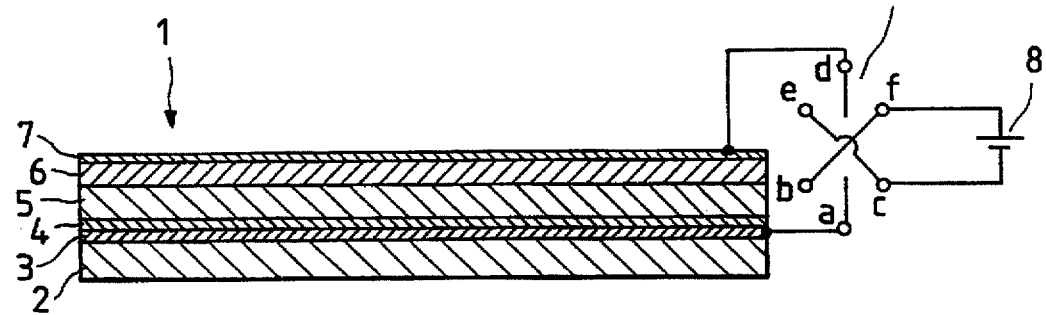
FIG. 8 is a longitudinal section of the conventional anti-glare EC mirror.
Figure 2:
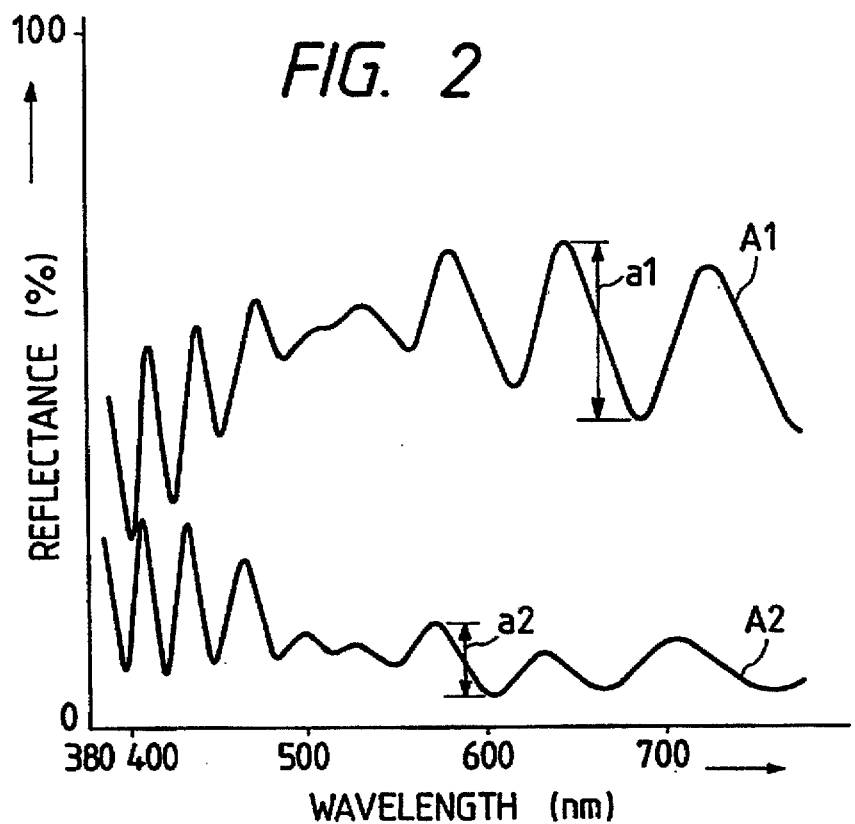
FIG. 2 is a graph showing the reflectance vs wavelength relationship of the mirror.
Figure 3:
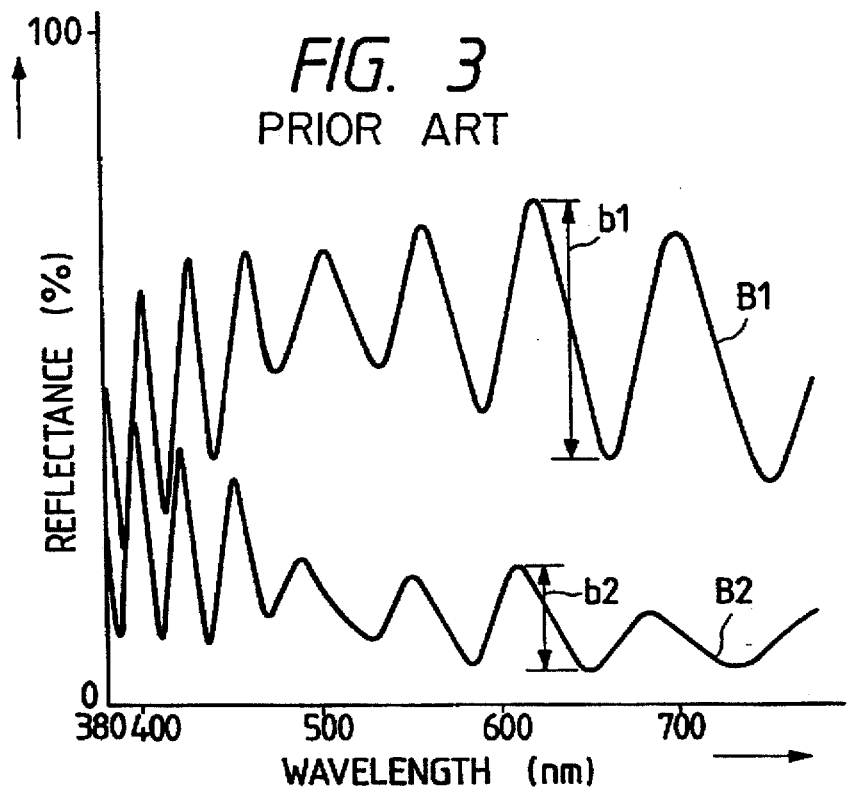
FIG. 3 is a graph showing the reflectance vs wavelength relationship of a conventional anti-glare EC mirror.

The reflectance of the anti-glare EC mirror 11 of the first embodiment under consideration (the thickness of the $SnO_2$ film 15 being about 500 Å) was measured with a spectrophotometer at varying wavelengths and the results are shown in FIG. 2. Similarly, the reflectance of the conventional anti-glare EC mirror 1 (see FIG. 8) that had been aged by 10 applications of dc voltage as in the first embodiment under consideration was measured with a spectrophotometer at varying wavelengths and the results are shown in FIG. 3. In FIG. 2, curve A1 refers to the reflectance with the anti-glare effect removed, and curve A2 refers to the reflectance with the anti-glare effect provided. In FIG. 3, curve B1 refers to the reflectance with the anti-glare effect removed, and curve B2 refers to the reflectance with the anti-glare effect provided. Comparing FIGS. 2 and 3, one can see that the amplitude a1 by which the curve A1 fluctuates is smaller than the amplitude b1 by which the curve B1 fluctuates, and that the amplitude a2 by which the curve A2 fluctuates is also smaller than the amplitude b2 by which the curve B2 fluctuates. Obviously, the anti-glare EC mirror 11 of the first embodiment under consideration was considerably suppressed in interference compared with the conventional one.

It is interesting to note that in order to accomplish aging in the conventional anti-glare EC mirror 1 until it had a comparable interference suppressing effect to the mirror 11 of the first embodiment under consideration, the already described procedure consisting of applying dc voltage for 1 or 2 minutes and then interrupting the voltage application had to be repeated 100 times. This means that aging time can be shortened in the first embodiment to about one tenth of the time that has been required in the conventional one.

A second embodiment of the present invention will now be explained with reference to FIGS. 4 to 7. The modification differs from the first embodiment in that the interference suppressing $SnO_2$ film 15 is replaced by a $SnO_{2-x}$ film. The $SnO_{2-x}$ film is less oxygen-rich than the $SnO_2$ film 15 and has a somewhat yellowish color wherein x is a number greater than zero and less than 2. This oxygen-poor $SnO_{2-x}$ film may be formed with the oxygen gas pressure as a film-forming parameter being adjusted to a lower level than when the $SnO_2$ film 15 is formed. Stated more specifically, the $SnO_2$ film 15 is formed at an oxygen gas pressure of $2.5 \times 10^{-2}$ Pa whereas the $SnO_{2-x}$ film is formed at an oxygen gas pressure of $1.2 \times 10^{-2}$ Pa.

It should be mentioned that the $SnO_2$ film 15 and the $SnO_{2-x}$ film have the same thickness, which is set at about 500 Å.

The anti-glare EC mirror of the second embodiment can operate with almost the same performance as the mirror 11 of the first embodiment. A noteworthy difference in that compared with the mirror 11 in which the reflecting surface, when provided with the anti-glare effect (supplied with a dc voltage), presents a bluish color that is not pleasing to the eye, the reflecting surface of the mirror of the second embodiment is neutral to the eye since it presents an achromatic color when provided with the anti-glare effect. this advantage of presenting an achromatic color is described below more specifically with reference to FIGS. 4 to 7.

Figure 4:
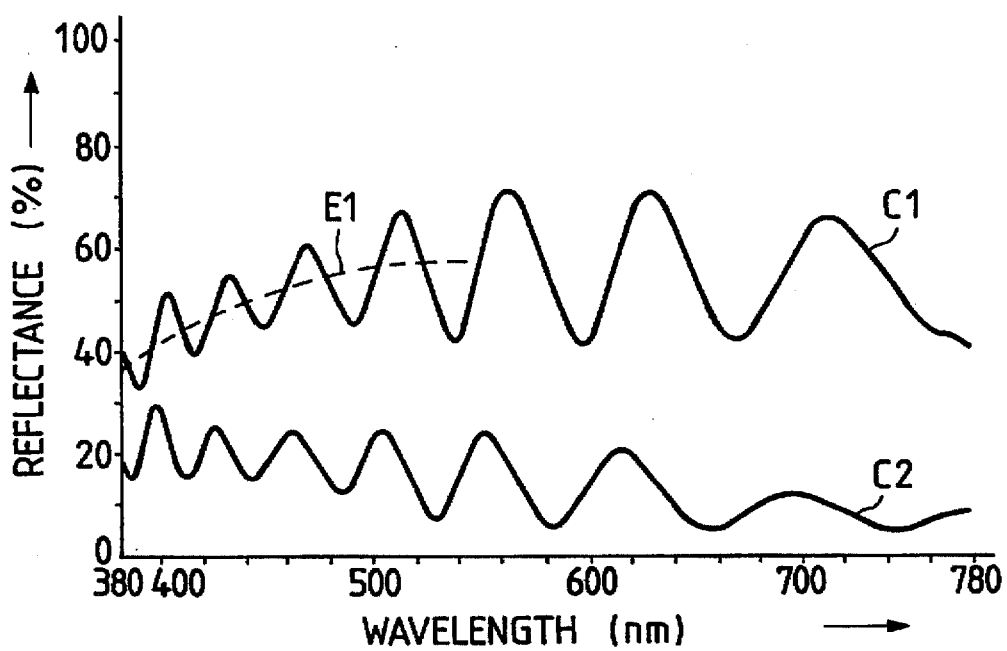
FIG. 4 is a graph showing the reflectance vs wavelength relationship of another anti-glare EC mirror according to the first embodiment of the invention.
Figure 5:
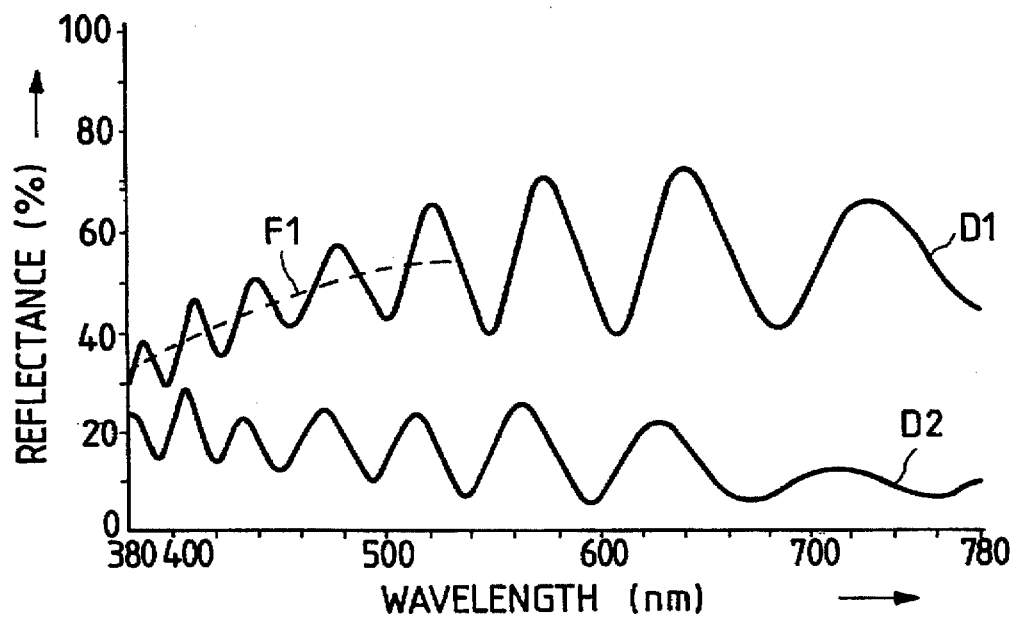
FIG. 5 is a graph showing the reflectance vs wavelength relationship of a anti-glare EC mirror of a second embodiment of the invention.

FIG. 4 shows the results of reflectance measurement on the anti-glare EC mirror 11 (using the $SnO_2$ film 15) with a spectrophotometer. FIG. 5 shows the results of reflectance measurement on the mirror of the second embodiment (using the $SnO_{2-x}$ film) with a spectrophotometer. With both mirrors, the aging operation was performed by repeating the same procedure through the same number of cycles. In FIG. 4, curve C1 refers to the reflectance with the anti-glare effect removed, and curve C2 refers to the reflectance with the anti-glare effect provided. In FIG. 5, curve D1 refers to the reflectance with the anti-glare effect removed, and curve D2 refers to the reflectance with the anti-glare effect provided.

Comparing FIGS. 4 and 5, one can see that curve C1 (indicated by dashed curve E1 in FIG. 4) is higher than curve D1 (as indicated by dashed curve F1 in FIG. 5) as a whole, and that the general position of curve C2 is also higher then that of curve D2. Obviously, the mirror of the second embodiment has lower reflectance than the mirror of the first embodiment irrespective of whether it is provided with the anti-glare effect or not. However, FIGS. 4 and 5 do not provide definite information as to how the color of the reflecting surface differs between the two mirrors. To cope with this difficulty, the inventors measured chromaticity coordinates.

Figure 6:
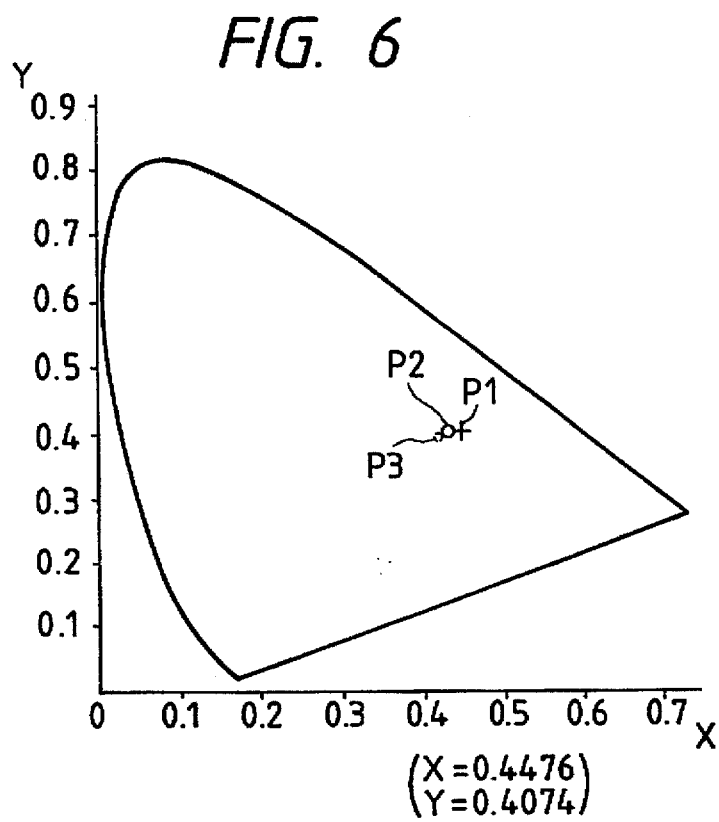
FIG. 6 is a graph showing the results of chromaticity coordinates measurements on the two anti-glare EC mirrors, with the anti-glare effect provided.

In the first place, with the anti-glare effect provided, two different anti-glare EC mirrors, the first being constructed according to the first embodiment already described above, and the second being of the second embodiment, were subjected to the measurement of chromaticity coordinates. The results are shown in FIG. 6. The plus "+" mark P1 in FIG. 6 represents the chromaticity coordinates of an achromatic color; the circle P2 drawn by a solid line represents the chromaticity coordinates for the mirror of the second embodiment; and the circle P2 drawn by a dashed line represents the chromaticity coordinates for the first embodiment mirror. As one can see from FIG. 6, the chromaticity coordinates for the mirror of the second embodiment are closer to those of an achromatic color than are the chromaticity coordinates for the first embodiment mirror; obviously, the color that is presented by the reflecting surface of the second embodiment is achromatic and neutral to the eye. FIG. 6 also shows that the chromaticity coordinates for the first embodiment mirror have a blue shift, indicating that said mirror presents a bluish color.

Figure 7:
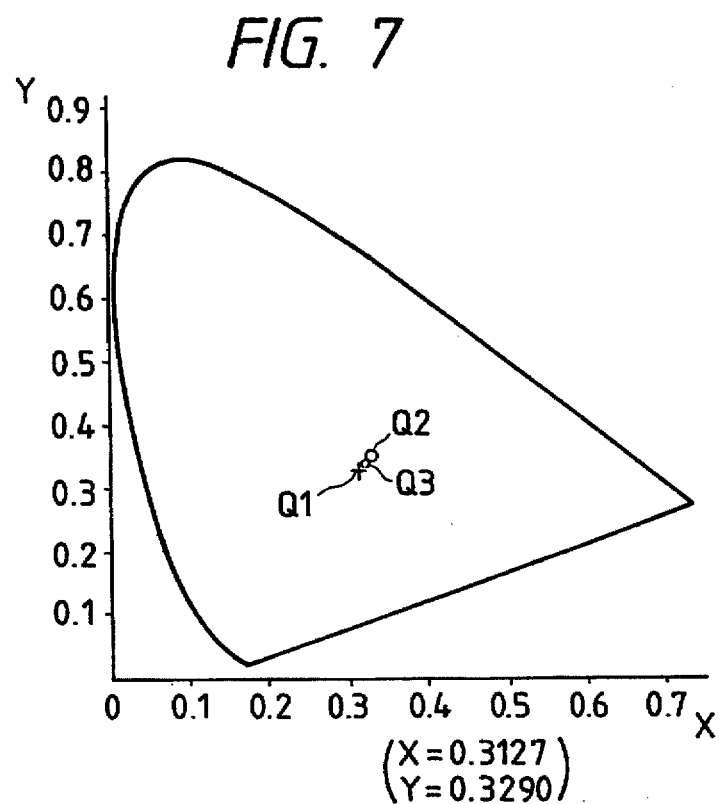
FIG. 7 is a graph showing the results of chromaticity coordinates measurements on the two anti-glare EC mirrors, with the anti-glare effect removed.

In the next place, the anti-glare effect was removed and chromaticity coordinates measurements were conducted for the two different anti-glare EC mirrors. The results are shown in FIG. 7. The plus "+" mark Q1 in FIG. 7 represents the chromaticity coordinates of an achromatic color; the circle Q2 drawn by a solid line represents the chromaticity coordinates for the mirror of the second embodiment; and the circle Q3 drawn by a dashed line represents the chromaticity coordinates for the first embodiment mirror. As one can see from FIG. 7, the chromaticity coordinates for the mirror of the second embodiment are farther away from those of an achromatic color than are the chromaticity coordinates for the first embodiment mirror (the mirror of the second embodiment presents a yellowish color compared with the first embodiment mirror). However, this yellowish color is hardly noticeable since the mirror of the second embodiment has high reflectance at the reflecting surface with the anti-glare effect removed and, hence, no practical problems will be caused by the yellowish color.

In the first embodiment described above, the $SnO_2$ film 15 is formed as an interference suppressing film or the $SnO_{2-x}$ film is formed in the second embodiment. However, this is not the sole case of the invention and the interference suppressing film may be formed of other compounds such as $In_2O_3$, ZnO and $TiO_2$.

As will be understood from the foregoing description, the anti-glare EC mirror of the invention has the interference suppressing film which is inserted between the oxidatively coloring film and the electrolyte film. Because of this arrangement, the aging of the oxidatively coloring film can be effected within a shorter time and yet the difference in refractive index between the oxidatively coloring film and the electrolyte film can be sufficiently reduced to suppress the interference on the reflecting surface of the mirror to a satisfactory low level.

What is claimed is:

1. An anti-glare electrochromic mirror comprising in the following order:

a transparent substrate;

a transparent electroconductive film on top of said transparent substrate;

an oxidatively coloring film having a first refractive index on top of said transparent electroconductive film;

an interference suppressing film on top of said oxidatively coloring film;

an electrolyte film having a second refractive index on top of said interference suppressing film;

a reductively coloring film on top of said transparent electrolyte film; and a reflective film of a electroconductive material on top of said reductively coloring film; wherein said interference suppressing film has a refractive index intermediate said first and second refractive indices.

2. An anti-glare electrochromic mirror according to claim 1, wherein said transparent electroconductive film serves as one electrode, and said reflective film serves as the other electrode.

3. An anti-glare electrochromic mirror according to claim 1, wherein said interference suppressing film is made from $SnO_2$.

4. An anti-glare electrochromic mirror according to claim 3, wherein said transparent substrate is made of glass, said transparent electroconductive film is made of ITO, said oxidatively coloring film is made of $IrO_x$, said electrolyte film is made of $Ta_2O_5$, said reductively coloring film is made of $WO_3$, and said reflective film is made of Al.

5. An anti-glare electrochromic mirror according to claim 4, wherein said transparent electroconductive film has a thickness of 2000 Å, said oxidatively coloring film has a thickness from 200 Å to 500 Å, said interference suppressing film has a thickness from 100 Å to 2000 Å, said electrolyte film has a thickness from 5000 Å to 7000 Å, said reductively coloring film has a thickness from 4000 Å to 5000 Å, and said reflective film has a thickness of 1000 Å.

6. An anti-glare electrochromic mirror according to claim 1, wherein said interference suppressing film is made from $SnO_{2-x}$ wherein x is a number greater than zero and less than 2.

7. An anti-glare electrochromic mirror according to claim 6, wherein said transparent substrate is made of glass, said transparent electroconductive film is made of ITO, said oxidatively coloring film is made of $IrO_x$, said electrolyte film is made of $Ta_2O_5$, said reductively coloring film is made of $WO_3$, and said reflective film is made of Al.

8. An anti-glare electrochromic mirror according to claim 7, wherein said transparent electroconductive film has a thickness of 2000 Å, said oxidatively coloring film has a thickness from 200 Å to 500 Å, said interference suppressing film has a thickness from 100 Å to 2000 Å, said electrolyte film has a thickness from 5000 Å to 7000 Å, said reductively coloring film has a thickness from 4000 Å to 5000 Å, and said reflective film has a thickness of 1000 Å.

9. An anti-glare electrochromic mirror according to claim 1, wherein said interference suppressing film is made from $In_2O_3$.

10. An anti-glare electrochromic mirror according to claim 9, wherein said transparent substrate is made of glass, said transparent electroconductive film is made of ITO, said oxidatively coloring film is made of $IrO_x$, said electrolyte film is made of $Ta_2O_5$, said reductively coloring film is made of $WO_3$, and said reflective film is made of Al.

11. An anti-glare electrochromic mirror according to claim 1, wherein said interference suppressing film is made from ZnO.

12. An anti-glare electrochromic mirror according to claim 11, wherein said transparent substrate is made of glass, said transparent electroconductive film is made of ITO, said oxidatively coloring film is made of $IrO_x$, said electrolyte film is made of $Ta_2O_5$, said reductively coloring film is made of $WO_3$, and said reflective film is made of Al.

13. An anti-glare electrochromic mirror according to claim 1, wherein said interference suppressing film is made from $TiO_2$.

14. An anti-glare electrochromic mirror according to claim 13, wherein said transparent substrate is made of glass, said transparent electroconductive film is made of ITO, said oxidatively coloring film is made of $IrO_x$, said electrolyte film is made of $Ta_2O_5$, said reductively coloring film is made of $WO_3$, and said reflective film is made of Al.

15. An anti-glare electrochromic mirror according to claim 1, wherein said interference suppressing film consists essentially of $SnO_{2-x}$ wherein x is a number greater than zero and less than 2.

16. An anti-glare electrochromic mirror according to claim 15, wherein said transparent substrate consists essentially of glass, said transparent electroconductive film consists essentially of ITO, said oxidatively coloring film consists essentially of $IrO_x$, said electrolyte film consists essentially of $Ta_2O_5$, said reductively coloring film consists essentially of $WO_3$, and said reflective film consists essentially of Al.

17. An anti-glare electrochromic mirror according to claim 16, wherein said transparent electroconductive film has a thickness of about 2000 Å, said oxidatively coloring film has a thickness of 200 Å to 500 Å, said interference suppressing film has a thickness from 100 Å to 2000 Å, said electrolyte film has a thickness from 5000 Å to 7000 Å, said reductively coloring film has a thickness from 4000 Å to 5000 Å, and said reflective film has a thickness of about 1000 Å.

18. An anti-glare electrochromic mirror comprising in the following order:
 a transparent substrate;
 a transparent electroconductive film on top of said transparent substrate;
 an oxidatively coloring film on top of said transparent electroconductive film;
 an interference suppressing film on top of said oxidatively coloring film;
 an electrolyte film on top of said interference suppressing film;
 a reductively coloring film on top of said transparent electrolyte film; and
 a reflective film of a electroconductive material on top of said reductively coloring film; wherein
 said interference suppressing film supplies water to the oxidatively coloring film.

19. An anti-glare electrochromic mirror according to claim 18, wherein said transparent electroconductive film serves as one electrode, and said reflective film serves as the other electrode.

20. An anti-glare electrochromic mirror according to claim 18, wherein said interference suppressing film consists essentially of $SnO_2$.

21. An anti-glare electrochromic mirror according to claim 20, wherein said transparent substrate is made of glass, said transparent electroconductive film consists essentially of ITO, said oxidatively coloring film consists essentially of $IrO_x$, said electrolyte film consists essentially of $Ta_2O_5$, said reductively coloring film consists essentially of $WO_3$, and said reflective film consists essentially of Al.

22. An anti-glare electrochromic mirror according to claim 21, wherein said transparent electroconductive film has a thickness of about 2000 Å, said oxidatively coloring film has a thickness from 200 Å to 500 Å, said interference suppressing film has a thickness from 100 Å to 2000 Å, said electrolyte film has a thickness from 5000 Å to 7000 Å, said reductively coloring film has a thickness from 4000 Å to 5000 Å, and said reflective film has a thickness of about 1000 Å.

23. An anti-glare electrochromic mirror according to claim 18, wherein said interference suppressing film consists essentially of $In_2O_3$.

24. An anti-glare electrochromic mirror according to claim 23, wherein said transparent substrate consists essentially of glass, said transparent electroconductive, film consists essentially of ITO, said oxidatively coloring film consists essentially of $IrO_x$, said electrolyte film consists essentially of $Ta_2O_5$, said reductively coloring film consists essentially of $WO_3$, and said reflective film consists essentially of Al.

25. An anti-glare electrochromic mirror according to claim 18, wherein said interference suppressing film consists essentially of ZnO.

26. An anti-glare electrochromic mirror according to claim 25, wherein said transparent substrate of glass, said transparent electroconductive film consists essentially of ITO, said oxidatively coloring film consists essentially of $IrO_x$, said electrolyte film consists essentially of $Ta_2O_5$, said reductively coloring film consists essentially of $WO_3$, and said reflective film consists essentially of Al.

27. An anti-glare electrochromic mirror according to claim 18, wherein said interference suppressing film consists essentially of $TiO_2$.

28. An anti-glare electrochromic mirror according to claim 27, wherein said transparent substrate of consists essentially of glass, said transparent electroconductive film consists essentially of ITO, said oxidatively coloring film consists essentially of $IrO_x$, said electrolyte film consists essentially of $Ta_2O_5$, said reductively coloring film consists essentially of $WO_3$, and said reflective film consists essentially of Al.

29. An anti-glare electrochromic mirror according to claim 18, wherein said oxidatively coloring film has a first refractive index;
said electrolyte film has a second refractive index; and
said interference suppressing film has a refractive index intermediate said first and second refractive indices.

* * * * *

UNITED STATES PATENT AND TRADEMARK OFFICE
CERTIFICATE OF CORRECTION

PATENT NO. : 5,673,150
DATED : September 30, 1997
INVENTOR(S) : Koichi ONO et al.

It is certified that error appears in the above-indentified patent and that said Letters Patent is hereby corrected as shown below:

In Claim 1, column 6, line 51, "a electroconductive" should read --an electroconductive--.

In Claim 24, column 8, line 54, after "electroconductive" delete ",".

In claim 28, column 9, line 7, after "substrate" delete "of".

Signed and Sealed this

Twenty-first Day of July, 1998

Attest:

BRUCE LEHMAN

Attesting Officer

Commissioner of Patents and Trademarks